(12) United States Patent
Adams et al.

(10) Patent No.: US 10,864,541 B2
(45) Date of Patent: Dec. 15, 2020

(54) ULTRASONIC ATOMIZER WITH QUICK-CONNECT MECHANISM

(71) Applicant: Ford Motor Company, Dearborn, MI (US)

(72) Inventors: Scott Adams, Everett, WA (US); Kevin Richard John Ellwood, Ann Arbor, MI (US); Wanjiao Liu, Ann Arbor, MI (US); Christopher Michael Seubert, New Hudson, MI (US); Mark Edward Nichols, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/211,316

(22) Filed: Dec. 6, 2018

(65) Prior Publication Data

US 2019/0232323 A1    Aug. 1, 2019

Related U.S. Application Data

(60) Provisional application No. 62/624,013, filed on Jan. 30, 2018.

(51) Int. Cl.
*B05B 17/00* (2006.01)
*B05B 13/04* (2006.01)
(Continued)

(52) U.S. Cl.
CPC .......... *B05B 17/0646* (2013.01); *B05B 1/262* (2013.01); *B05B 3/02* (2013.01);
(Continued)

(58) Field of Classification Search
CPC ..... B05C 5/0291; B05C 19/00; B05C 19/008; B05C 19/04; B05C 19/06; B05B 17/0646;
(Continued)

(56) References Cited

U.S. PATENT DOCUMENTS

| | | | |
|---|---|---|---|
| 3,679,132 A | * | 7/1972 | Vehe ........................ B05B 1/083 239/4 |
| 4,038,570 A | | 7/1977 | Durley, III |

(Continued)

FOREIGN PATENT DOCUMENTS

| | | |
|---|---|---|
| CN | 103736620 | 4/2014 |
| CN | 104689946 | 6/2015 |

(Continued)

OTHER PUBLICATIONS

Hielscher—Ultrasound Technology, Ultrasonic Spraying, Nebulizing, and Atomizing, Sep. 17, 2018.

(Continued)

*Primary Examiner* — Laura Edwards
(74) *Attorney, Agent, or Firm* — Burris Law, PLLC (57) ABSTRACT

An apparatus for applying a coating to a substrate includes a base, an applicator, and a quick-connect connector. The base includes a fluid conduit. The applicator includes at least one actuator and an array of nozzle plates. Each nozzle plate defines at least one aperture. The at least one actuator is configured to oscillate the nozzle plates to eject fluid from the apertures. The quick-connect connector couples the fluid conduit to the applicator for fluid communication therebetween.

20 Claims, 6 Drawing Sheets

(51) Int. Cl.

| | | |
|---|---|---|
| *B05B 17/06* | (2006.01) | |
| *B05B 3/14* | (2006.01) | |
| *B05B 3/02* | (2006.01) | |
| *B05B 15/628* | (2018.01) | |
| *B05B 12/36* | (2018.01) | |
| *B05B 15/625* | (2018.01) | |
| *B05B 12/16* | (2018.01) | |
| *B05B 7/14* | (2006.01) | |
| *B25J 11/00* | (2006.01) | |
| *B05B 12/00* | (2018.01) | |
| *B05B 15/68* | (2018.01) | |
| *B05B 1/26* | (2006.01) | |
| *B05B 15/00* | (2018.01) | |
| *B05D 1/02* | (2006.01) | |
| *B05D 1/12* | (2006.01) | |
| *B05D 3/06* | (2006.01) | |

(52) U.S. Cl.
CPC .............. *B05B 3/14* (2013.01); *B05B 7/1481* (2013.01); *B05B 12/00* (2013.01); *B05B 12/16* (2018.02); *B05B 12/36* (2018.02); *B05B 13/0431* (2013.01); *B05B 13/0452* (2013.01); *B05B 15/00* (2013.01); *B05B 15/625* (2018.02); *B05B 15/628* (2018.02); *B05B 15/68* (2018.02); *B05B 17/06* (2013.01); *B05B 17/063* (2013.01); *B05B 17/0653* (2013.01); *B05B 17/0669* (2013.01); *B05D 1/02* (2013.01); *B05D 1/12* (2013.01); *B05D 3/067* (2013.01); *B25J 11/0075* (2013.01)

(58) Field of Classification Search
CPC ......... B05B 3/02; B05B 13/0452; B05B 3/14; B05B 17/0669; B05B 17/06; B05B 15/00; B05B 1/262; B05B 15/68; B05B 12/00; B05B 7/1481; B05B 12/16; B05B 17/063; B05B 15/625; B05B 12/36; B05B 15/628; B05B 13/0431; B05D 3/067; B05D 1/12; B25J 11/0075; Y10S 901/43; F16L 37/56; F16L 37/00; E21B 17/043; F16B 7/042; F16B 21/165
USPC ................... 285/26, 91, 305, 361; 118/313
See application file for complete search history.

(56) References Cited

U.S. PATENT DOCUMENTS

| | | | | |
|---|---|---|---|---|
| 4,697,741 | A | * | 10/1987 | Dengler ............ B05B 13/0431 239/391 |
| 4,871,489 | A | * | 10/1989 | Ketcham ................ B01J 2/08 264/9 |
| 4,955,366 | A | * | 9/1990 | Uchiyama ............ A61B 17/225 601/4 |
| 5,387,444 | A | | 2/1995 | Bachmann |
| 5,516,043 | A | | 5/1996 | Manna et al. |
| 5,540,384 | A | | 7/1996 | Erickson et al. |
| 5,624,075 | A | | 4/1997 | Dankert |
| 5,636,798 | A | | 6/1997 | Buschor |
| 5,669,971 | A | | 9/1997 | Bok et al. |
| 5,823,428 | A | | 10/1998 | Humberstone et al. |
| 6,394,363 | B1 | | 5/2002 | Arnott et al. |
| 6,666,835 | B2 | | 12/2003 | Martin et al. |
| 6,755,985 | B2 | | 6/2004 | Fiala et al. |
| 7,168,633 | B2 | | 1/2007 | Wang et al. |
| 7,350,890 | B2 | | 4/2008 | Baird et al. |
| 7,550,897 | B2 | | 6/2009 | Hailes |
| 7,704,564 | B2 | | 4/2010 | DeRegge et al. |
| 7,934,665 | B2 | | 5/2011 | Erickson et al. |
| 7,976,135 | B2 | | 7/2011 | Brown et al. |
| 7,977,849 | B2 | | 7/2011 | Hailes et al. |
| 8,191,982 | B2 | | 6/2012 | Brown et al. |
| 8,317,299 | B2 | | 11/2012 | Brown |
| 8,440,014 | B2 | | 5/2013 | Kitamura et al. |
| 8,524,330 | B2 | | 9/2013 | Fan et al. |
| 8,821,802 | B2 | | 9/2014 | Haran |
| 9,149,750 | B2 | | 10/2015 | Steele et al. |
| 9,156,049 | B2 | | 10/2015 | Galluzzo et al. |
| 9,452,442 | B2 | | 9/2016 | Selby et al. |
| 9,592,524 | B2 | | 3/2017 | Fritz et al. |
| 2006/0005766 | A1 | | 1/2006 | Gorges et al. |
| 2006/0210909 | A1 | * | 9/2006 | Ohtani ................ B01J 2/006 430/137.1 |
| 2007/0102537 | A1 | | 5/2007 | Stauch et al. |
| 2010/0183820 | A1 | | 7/2010 | Seubert et al. |
| 2010/0285234 | A1 | | 11/2010 | Van Den Berg et al. |
| 2013/0284833 | A1 | * | 10/2013 | Fritz .................. B05B 17/0607 239/690 |
| 2014/0110500 | A1 | | 4/2014 | Crichton et al. |
| 2015/0069146 | A1 | * | 3/2015 | Lowy .................... B05B 15/58 239/102.2 |
| 2016/0059262 | A1 | | 3/2016 | Seyler |
| 2016/0158789 | A1 | | 6/2016 | Selby et al. |
| 2016/0228902 | A1 | | 8/2016 | Crichton |

FOREIGN PATENT DOCUMENTS

| | | |
|---|---|---|
| CN | 104841592 | 8/2015 |
| DE | 19631811 | 2/1998 |
| DE | 20023848 | 12/2006 |
| DE | 102011088373 | 6/2013 |
| DE | 102013205171 | 9/2014 |
| EP | 1884365 | 2/2008 |
| GB | 2215240 | 9/1989 |
| JP | H0538809 | 2/1993 |
| JP | H08215616 | 8/1996 |
| JP | 2003091010 | 3/2003 |
| KR | 20180080977 | 7/2018 |
| WO | 2018108572 | 6/2018 |
| WO | 2018162872 | 9/2018 |

OTHER PUBLICATIONS

IEEE Globalspec, Equipment information page for Spray Guns and Applicators Information, available at URL https://www.globalspec.com/learnmore/manufacturing_process_equipment/surface_coating_protection/coating_paint_spray_guns.
Ransburg, Evolver 303 Dual Purge Solventborne Robotic Atomizers, Model: A12374-XXX, Service Manual AA-08-01.5, May 2015.
Regan, Michael, UV Coatings: Curing at Light-Speed, BodyShop Business, May 1, 2005.
Beswick Engineering, The Basics of Quick Disconnects, product information pages, Beswick Engineering Co., Inc.

* cited by examiner

ULTRASONIC ATOMIZER WITH QUICK-CONNECT MECHANISM

CROSS-REFERENCE TO RELATED APPLICATIONS

This application claims priority to provisional application 62/624,013 filed on Jan. 30, 2018. The disclosure of the above application is incorporated herein by reference.

FIELD

The present disclosure relates to high volume coating equipment and more specifically an atomizer with a nozzle connection device.

BACKGROUND

The statements in this section merely provide background information related to the present disclosure and may not constitute prior art.

Coating automotive vehicles (e.g., vehicle frames, bodies, panels, etc.) with coatings (e.g., primer, basecoat, clearcoat, etc.) in a high-volume production environment involves substantial capital cost, not only for application and control of the coating, but also for equipment to capture overspray. The overspray can be up to 40% of the coating that exits an applicator, or in other words, up to 40% of the coating that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200,000 cubic feet per minute) that flows through the paint booths must be conditioned, the flow of water must be maintained, compressed air must be supplied, and complex electrostatics are employed to improve transfer efficiency.

With known production equipment, the liquid coating is atomized by a nozzle that includes a rotating bell, which is essentially a rotating disk or bowl that spins at about 20,000-80,000 revolutions per minute. The liquid is typically ejected from an annular slot on a face of the rotating disk and is propelled towards the edges of the bell via centrifugal force. The liquid then forms ligaments and then droplets at the edges of the bell. Although this equipment works for its intended purpose, various issues arise as a result of its design. First, the momentum of the liquid coating is mostly lateral, meaning it is moving in a direction parallel to the vehicle rather than towards the vehicle. To compensate for this movement, shaping air is applied that redirects the liquid droplets towards the vehicle. In addition, electrostatics are used to steer the droplets towards the vehicle. The droplets have a fairly wide size distribution, which can cause appearance issues. Furthermore, changing out a rotating bell atomizer nozzle, such as for replacement or cleaning, requires considerable time to ensure the bell is properly balanced.

The present disclosure addresses these issues associated with traditional high-volume production paint booth operations.

SUMMARY

This section provides a general summary of the disclosure and is not a comprehensive disclosure of its full scope or all of its features.

In one form, an apparatus for applying a coating to a substrate includes a base, an applicator, and a quick-connect connector. The base includes a fluid conduit. The applicator includes at least one actuator and an array of nozzle plates. Each nozzle plate defines at least one aperture. The at least one actuator is configured to oscillate the nozzle plates to eject fluid from the apertures. The quick-connect connector couples the fluid conduit to the applicator for fluid communication therebetween. In a variety of alternate forms of the present disclosure: the at least one actuator is at least one piezoelectric actuator; the at least one actuator includes a plurality of actuators, each actuator configured to oscillate a corresponding one of the nozzle plates; the apparatus further includes a robotic arm supporting the base; each nozzle plate includes a plurality of the apertures; the applicator includes an array body supporting the nozzle plates, wherein the quick-connect connector is one quick-connect connector of a plurality of quick-connect connectors, each quick-connect connector configured to couple a corresponding one of the nozzle plates to the nozzle body; the applicator includes an array body supporting the nozzle plates, wherein the quick-connect connector couples the array body to the base; the apparatus further includes a control module in electrical communication with the at least one actuator; the applicator defines at least one reservoir; the at least one reservoir includes a plurality of reservoirs, each reservoir being at least partially defined by a corresponding one of the nozzle plates; each reservoir has a volume of 1 mL or less; wherein the quick-connect connector includes a first fitting and a second fitting, the first fitting defining a circumferential groove and a nose, the second fitting including a retaining member configured to be received in the groove and movable between a locked position and an unlocked position, wherein when in the locked position, the retaining member is disposed within the groove and engages a shoulder of the groove to inhibit axial movement of the first fitting relative to the second fitting, wherein when in the unlocked position, the first and second fittings are axially movable relative to each other, wherein one of the first fitting or the second fitting is fixedly coupled to the base and the other one of the first fitting or the second fitting is fixedly coupled to the applicator; the quick-connect connector includes an electrical connection between the base and the applicator configured to transmit electrical signals from the base to the at least one actuator.

In another form, an apparatus for applying a coating to a substrate includes a base, an applicator, and a quick-connect connector. The applicator includes an actuator and a nozzle plate defining at least one aperture. The actuator is configured to oscillate the nozzle plate to eject fluid from the at least one aperture. The quick-connect connector couples the applicator to the base for fluid communication and electrical communication therebetween. In a variety of alternate forms of the present disclosure: the actuator is a piezoelectric actuator; the applicator comprises a plurality of the actuators and a plurality of the nozzle plates, each actuator being configured to oscillate a corresponding one of the nozzle plates; the applicator includes an array body supporting the nozzle plates, wherein the quick-connect connector is one quick-connect connector of a plurality of quick-connect connectors, each quick-connect connector configured to couple a corresponding one of the nozzle plates to the nozzle body; the applicator includes an array body supporting the nozzle plates, wherein the quick-connect connector couples the array body to the base; the apparatus further including a robotic arm supporting the base; the nozzle plate includes a plurality of the apertures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Figure 1:
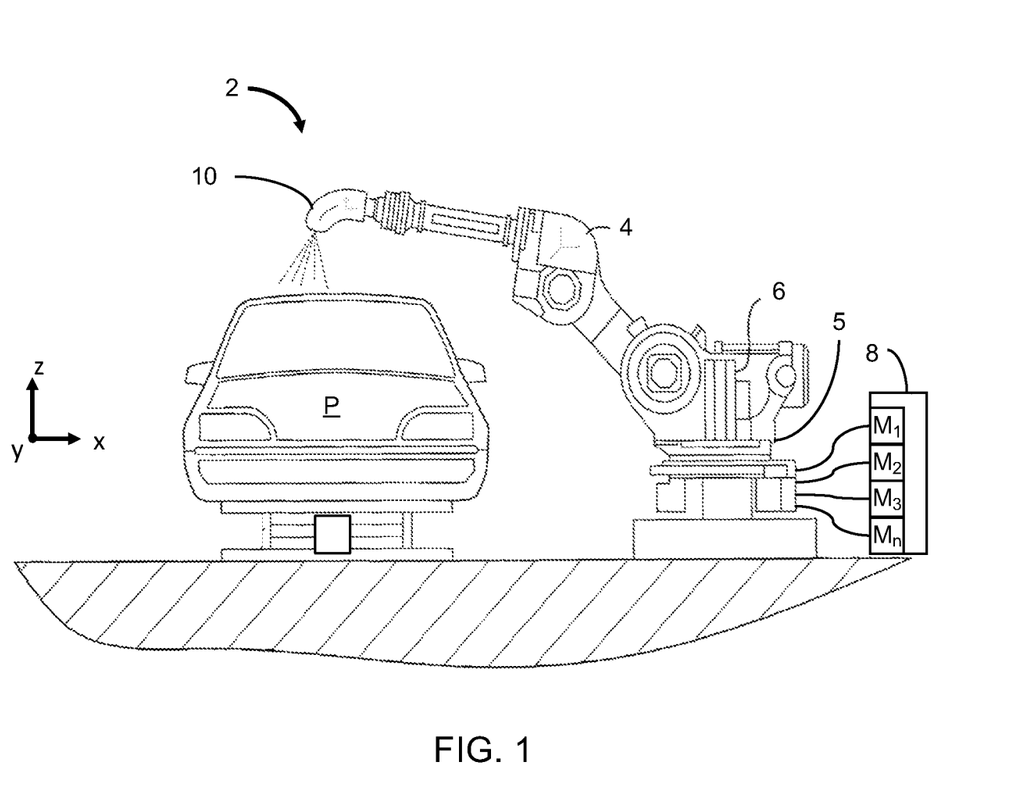
FIG. 1 schematically depicts a booth for automated coating of a vehicle according to the teachings of the present disclosure.

Referring now to FIG. 1, a paint spray system 2 for painting a part P using a robotic arm 4 is schematically depicted. The robotic arm 4 is coupled to at least one material applicator 10 and a rack 5. A material source 8 (e.g., a paint source) is included and includes at least one material M (materials $M_1$, $M_2$, $M_3$, ... $M_n$ shown in FIG. 1; also referred to herein simply as "material M"). In some aspects of the present disclosure the at least one material M includes different paint materials, different adhesive materials, different sealant materials, and the like. The arm 4 moves according to xyz coordinates with respect to rack 4 such that the material applicator 10 moves across a surface (not labeled) of the part P. Also, a power source 6 is configured to supply power to arm 4 and rack 5. Arm 4 and rack 5 are configured to supply material M from the material source 8 to the material applicator 10 such that a coating is applied to the surface of the part P.

Figure 2:
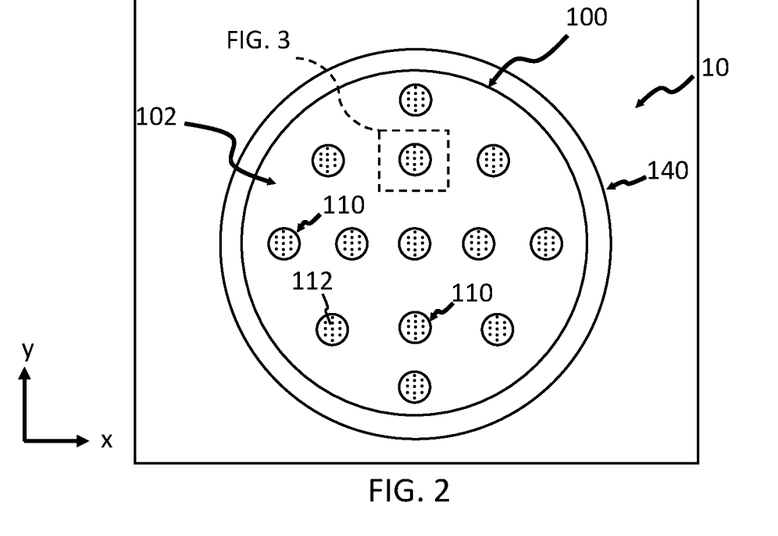
FIG. 2 schematically depicts a planar view of an applicator having an array of micro-applicators according to the teachings of the present disclosure.

Referring to FIG. 2 a material applicator 10 or atomizer according to the teachings of the present disclosure is schematically shown. In one form of the present disclosure, the material applicator 10 includes an array body 100 or nozzle with an applicator array 102 including a plurality of micro-applicators 110 or sub-nozzles. In some aspects of the present disclosure, the array body 100 with the applicator array 102 is positioned on a base 140. In one configuration, the base 140 is supported at the end of the articulating robotic arm 4 (FIG. 1). In another configuration, the base 140 is supported by a spray bar (not shown) which can be stationary or can move in one, two, or three dimensions relative to a substrate S (shown in FIG. 4). Each of the micro-applicators 110 includes a plurality of apertures 112 through which a material M (FIG. 4) is ejected such that atomized droplets 3 (FIG. 4) of the material is provided. As described above, the material M (FIG. 4) is generally a liquid material (e.g., primer, basecoat, clearcoat, etc.) but may optionally include interspersed solids, such as metallic flecks or other particles to provide a particular aesthetic look. The micro-applicators 110 can be arranged in any arrangement, such as a regular or an irregular pattern across the array body 100.

Figure 3:
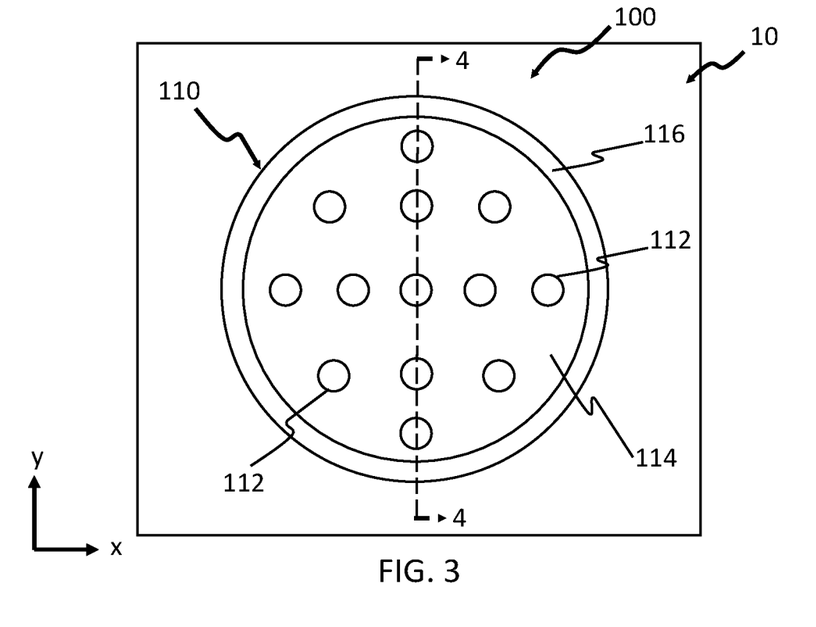
FIG. 3 schematically depicts a portion of the applicator of FIG. 2, illustrating one of the micro-applicators.
Figure 4:
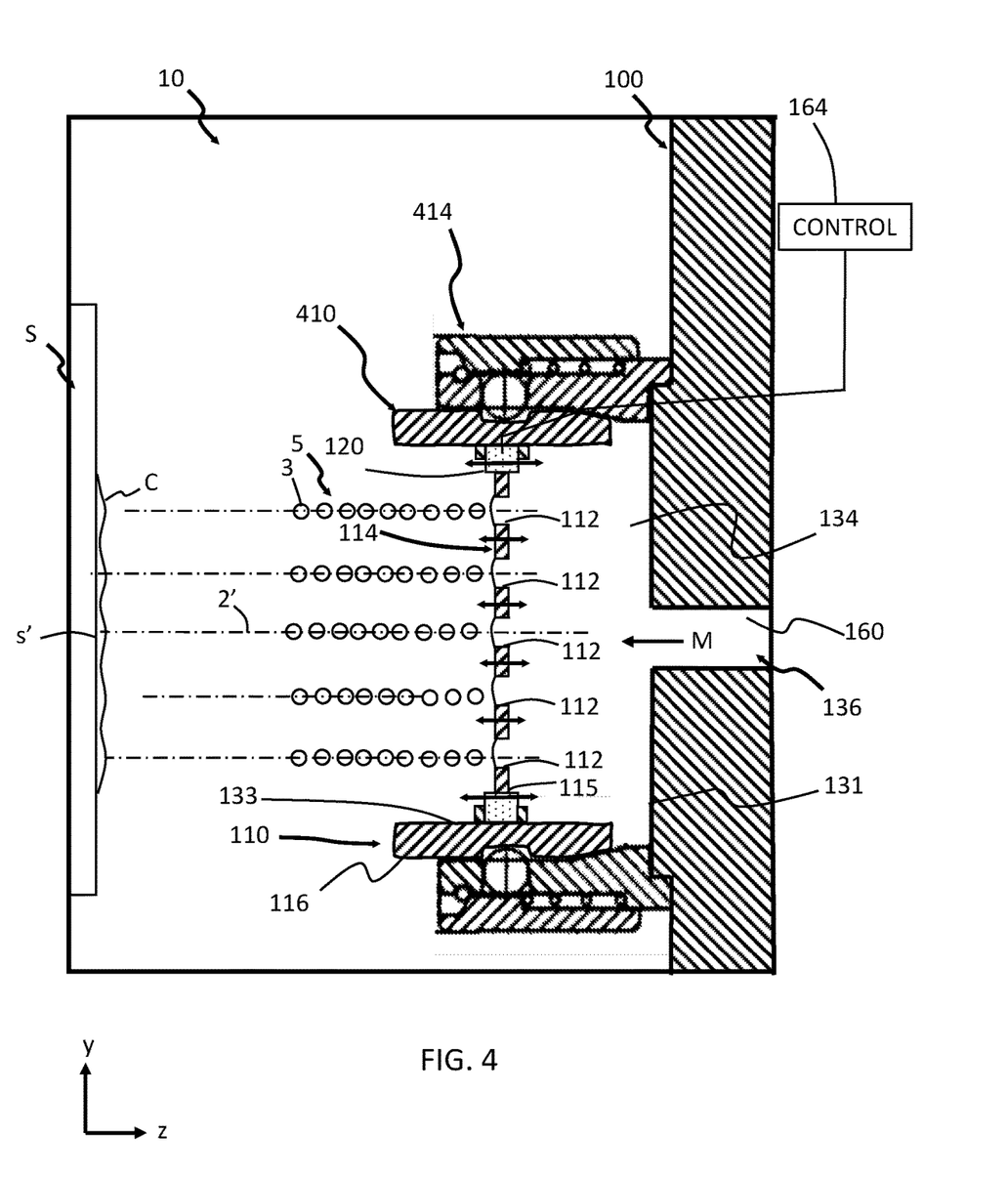
FIG. 4 schematically depicts a side cross-sectional view of section 4-4 in FIG. 3, illustrating a quick-connect nozzle according to the teachings of the present disclosure.

Referring to FIGS. 3 and 4, each of the micro-applicators 110 includes a nozzle body 116, a micro-applicator plate 114, and an actuator 120. Each micro-applicator plate 114 defines a plurality of the apertures 112 extending through the micro-applicator plate 114. The actuator 120 can be a transducer such as a piezoelectric material. The micro-applicator plate 114 is in mechanical communication with the actuator 120 such that activation of the actuator 120 (e.g., providing electrical power to the actuator 120) vibrates or oscillates the micro-applicator plate 114 as schematically depicted by the horizontal (z-direction) double-headed arrows in FIG. 4.

In the example provided, the nozzle body 116 is a generally cylindrical body and includes a male quick-connect fitting 410 and the array body 100 includes a female quick-connect fitting 414 configured to releasably mate with the male quick-connect fitting 410. In an alternative configuration, not specifically shown, the array body 100 includes a male quick-connect fitting and the nozzle body 116 includes a female quick-connect fitting.

Figure 5:
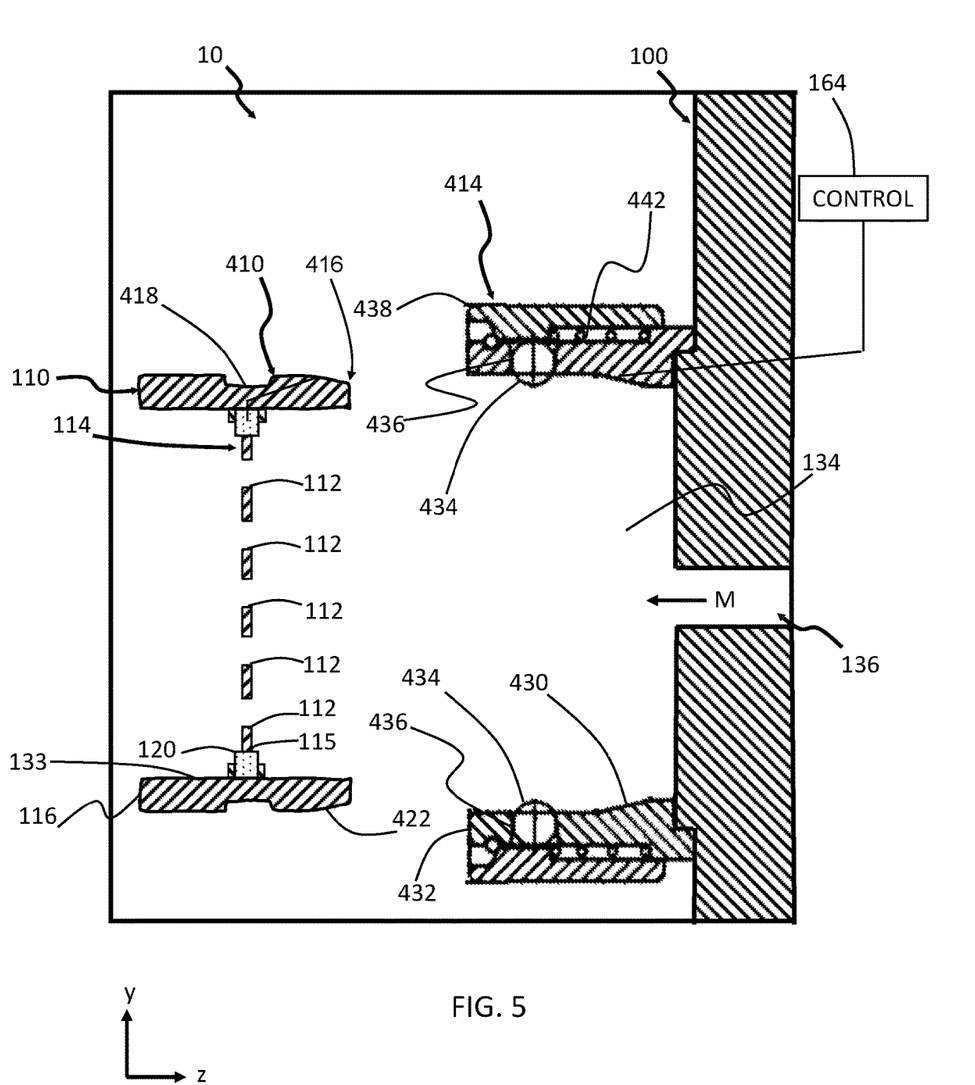
FIG. 5 schematically depicts an exploded side cross-sectional view of the quick-connect nozzle of FIG. 4.
Figure 6:
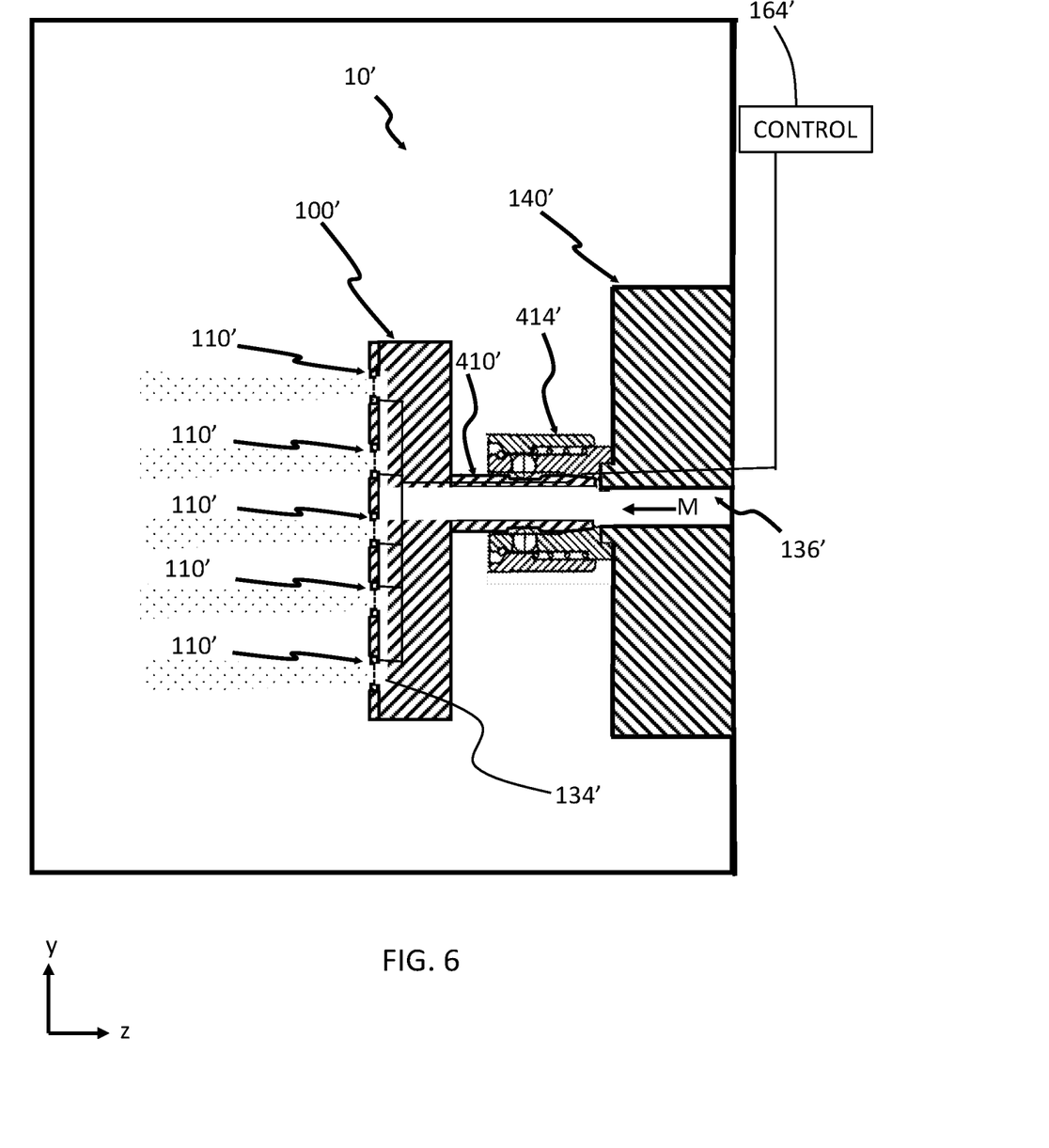
FIG. 6 schematically depicts a side cross-sectional view of an applicator of a second construction having a quick-connect nozzle with an array of micro-applicators according to the teachings of the present disclosure.
Figure 7:
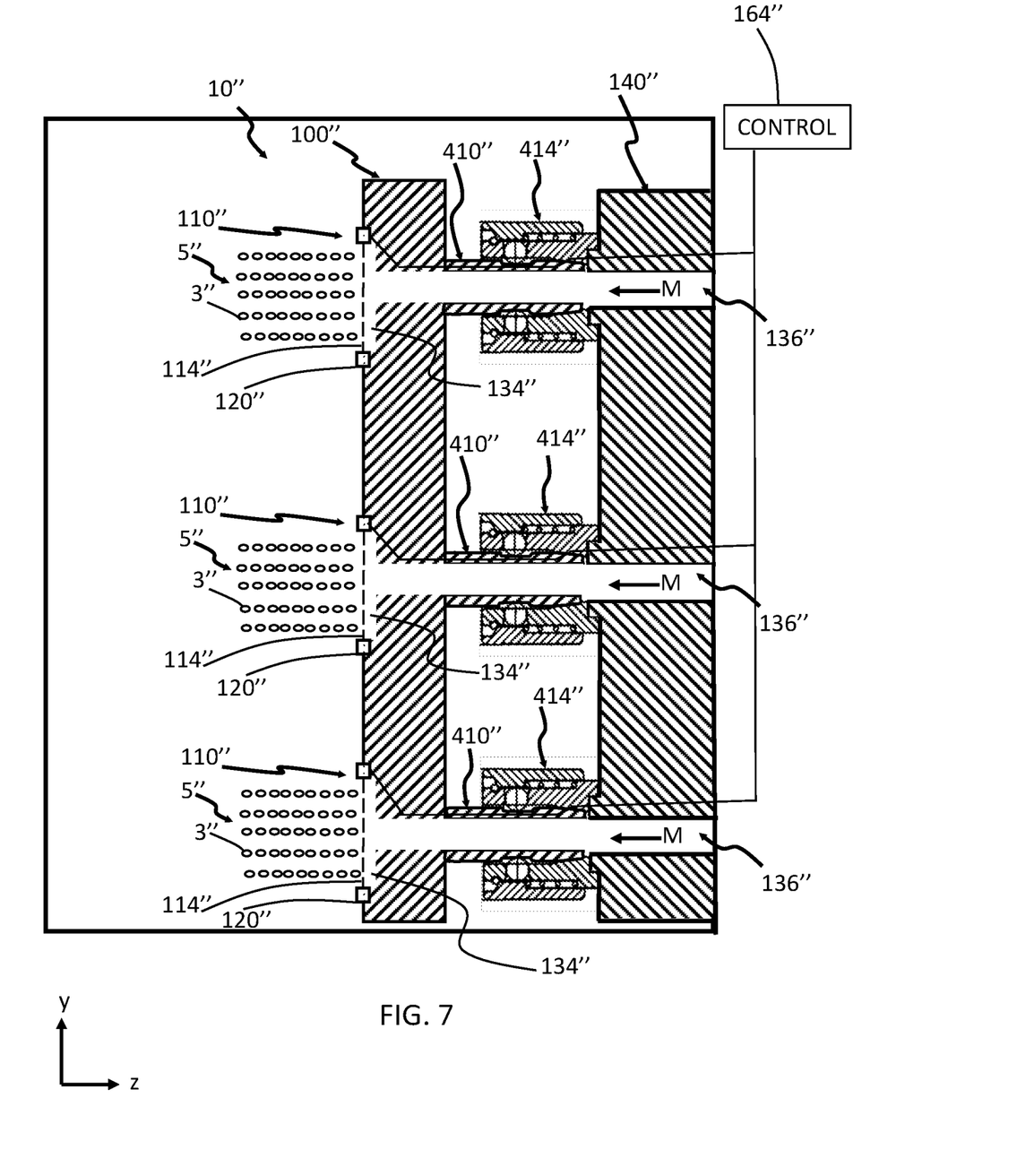
FIG. 7 schematically depicts a side cross-sectional view of an applicator of a third construction having a quick-connect nozzle with an array of micro-applicators according to the teachings of the present disclosure.

Referring to FIG. 5, the male quick-connect fitting 410 includes a nose, a locking groove 418 and a first sealing surface 422 that extends circumferentially about the nozzle body 116. The sealing surface 422 is configured to contact and seal with a mating sealing surface 430 disposed about an interior of the female quick-connect fitting 414. The female quick-connect fitting 414 includes a generally cylindrical body 432 and a retainer, which in the particular example provided, is a plurality of locking balls 434 (i.e., members) that are circumferentially spaced about the female quick-connect fitting 414 and configured to move radially between a locked position (shown) and an unlocked position within bores 436 that extend radially through the cylindrical body 432.

In the locked position, the balls 434 extend radially inward a greater extent than when in the unlocked position and can be captured within the groove 418 to engage a shoulder of the groove 418 to prevent axial withdrawal of the male quick-connect fitting 410. A collar 438 of the female quick-connect fitting 414 is movable in the axial direction to permit or prevent the balls 434 from moving between the locked position and the unlocked position, depending on the axial position of the collar 438. In the example provided, a spring 442 biases the collar 438 toward the locked position and a snap ring 446 maintains the collar 438 on the. While one specific type of quick-connect fitting is illustrated, other types can be used (e.g., bayonet-type).

Referring to FIGS. 4 and 5, the array body 100 includes a material inlet 136 corresponding to each micro-applicator 110. The array body 100 includes a back wall 131 such that a reservoir 134 for containing the material M is provided between the back wall 131 and the micro-applicator plate 114. In the example provided, the back wall 131, a portion of the nozzle body 116 and the side of the micro-applicator plate 114 that faces the back wall 131 cooperate to define the reservoir 134. The inlet 136 is in fluid communication with the reservoir 134 such that the material M flows through the inlet 136 and into the reservoir 134. In the example provided, the actuator 120 is positioned between the micro-applicator plate 114 and the nozzle body 116 so that the nozzle body 116 supports the actuator 120 and the actuator 120 supports the micro-applicator plate 114. For example, the actuator 120 may be positioned between an outer edge surface 115 of the micro-applicator plate 114 and an inner surface 133 of the nozzle body 116. In one configuration, the actuator 120 is an annular shape disposed about the micro-applicator plate 114. In another configuration, not specifically shown, the actuator 120 can be integrally formed with the micro-applicator plate 114 such that supplying power to the micro-applicator plate 114 oscillates the plate 114.

In the example provided, a control module 164 is in electric communication with the actuator 120 to provide power to and control operation of the actuator 120. In the example provided, an electrical connection is made through electrical contacts on the male and female quick-connect fittings 410, 414, though other configurations can be used.

Still referring to FIG. 4, the material M is supplied to the reservoir 134 at a very low pressure or no pressure, such that surface tension of the material M resists the material M from flowing through the apertures 112 of the micro-applicator plate 114 unless the actuator 120 is activated and oscillates. That is, when the actuator 120 is activated and vibrates, the material M is ejected through and/or from the plurality of apertures 112 to provide a stream 5 of atomized droplets 3. The stream 5 of atomized droplets 3 propagates generally parallel to a micro-applicator axis 2' and forms a coating C on a surface s' of the substrate S. The substrate S can be any suitable workpiece such as a vehicle part, frame, or body for example. As schematically depicted in FIG. 4, the atomized droplets 3 have a narrow droplet size distribution (e.g., average droplet diameter).

Referring to FIG. 6, a cross section of a material applicator 10' of a second construction is illustrated. The material applicator 10' is similar to the material applicator 10 (FIGS. 1-5) except as otherwise shown or described herein. Features denoted with primed reference numerals are similar to the features shown and described in FIGS. 1-5 with similar, but non-primed reference numerals and only differences are described herein.

The array body 100' includes a male quick-connect fitting 410' configured to releasably connect to a mating female quick-connect fitting 414' on the base 140'. In the example provided, an electrical connection or connections are formed between contacts on the male and female quick-connect fittings 410', 414', to electrically connect the control module 164' to the actuators of the individual micro-applicators 110'. While the material M is illustrated as being provided to all of the micro-applicators 110' from a common inlet 136', each micro-applicator 110' can receive material M from individual inlets (not shown) though the male and female quick-connect fittings 410', 414'. The micro-applicators 110' can be non-removable relative to the array body 100', or can each be removably coupled to the array body 100' as shown and described above with reference to FIGS. 1-5.

Referring to FIG. 7, a cross section of a material applicator 10" of a second construction is illustrated. The material applicator 10" is similar to the material applicator 10 (FIGS. 1-5) and 10' (FIG. 6) except as otherwise shown or described herein. Features denoted with double primed reference numerals are similar to the features shown and described in FIGS. 1-5 with similar, but non-primed reference numerals or FIG. 6 with similar, but primed reference numerals, and only differences are described herein.

The array body 100" includes a plurality of male quick-connect fittings 410" configured to releasably connect to corresponding mating female quick-connect fittings 414" on the base 140". In the example provided, the material M flows from the base 140" to the individual micro-applicators 110" via corresponding inlets 136" and the material M in each micro-applicator 110" remains separate from the material M in the other micro-applicators 110". While the material M is illustrated as being provided to all of the micro-applicators 110" from corresponding inlets 136", each micro-applicator 110' can receive a different material (e.g., M1-Mn shown in FIG. 1). The individual micro-applicators 110" can be non-removable relative to the array body 100", or can each be removably coupled to the array body 100" as shown and described above with reference to FIGS. 1-5.

In the example provided, an electrical connection is formed between contacts on the male and female quick-connect fittings 410", 414", to electrically connect the control module 164" to the actuators 120" of the individual micro-applicators 110". Alternatively, a separate electrical connector (not shown) can connect the control module 164" to the array body 100" to provide the electrical connection to the actuators 120".

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An apparatus for applying a coating to a substrate, the apparatus comprising:
    a base including a fluid conduit;
    an applicator including a plurality of actuators and an array of nozzle plates, each nozzle plate defining at least one aperture, each actuator being configured to oscillate a corresponding one of the nozzle plates to eject fluid from the apertures; and
    a quick-connect connector that couples the fluid conduit to the applicator for fluid communication therebetween, wherein the quick-connect connector includes a first fitting and a second fitting, the first fitting defining a groove and a nose, the second fitting including a retainer configured to be received in the groove and movable between a locked position and an unlocked position, wherein when in the locked position, the retainer is disposed within the groove and engages a shoulder of the groove to inhibit axial movement of the first fitting relative to the second fitting, wherein when in the unlocked position, the first and second fittings are axially movable relative to each other, wherein one of the first fitting or the second fitting is coupled to the base and the other one of the first fitting or the second fitting is coupled to the applicator.

2. The apparatus of claim 1, wherein each actuator is a piezoelectric actuator.

3. The apparatus of claim 1, further comprising a robotic arm supporting the base.

4. The apparatus of claim 1, wherein each nozzle plate includes a plurality of the apertures.

5. The apparatus of claim 1, wherein the applicator includes an array body supporting the nozzle plates, wherein the apparatus comprises a plurality of the quick-connect connectors, each quick-connect connector configured to couple a corresponding one of the nozzle plates to the array body.

6. The apparatus of claim 1, wherein the applicator includes an array body supporting the nozzle plates, wherein the quick-connect connector couples the array body to the base.

7. The apparatus of claim 1, wherein the applicator defines at least one reservoir.

8. The apparatus of claim 7, wherein the at least one reservoir includes a plurality of reservoirs, each reservoir being at least partially defined by a corresponding one of the nozzle plates.

9. The apparatus of claim 8, wherein each reservoir has a volume of 1 mL or less.

10. The apparatus of claim 1, wherein the groove extends circumferentially about an axis of the first fitting.

11. The apparatus of claim 10, wherein the retainer is a ball and the second fitting includes a collar that is axially movable between a first position and a second position, wherein when in the first position the collar inhibits the ball from moving to the unlocked position, and wherein when in the second position the collar permits the ball to move to the unlocked position.

12. The apparatus of claim 1, wherein the quick-connect connector includes an electrical connection between the base and the applicator configured to transmit electrical signals from the base to the plurality of actuators.

13. An apparatus for applying a coating to a substrate comprising:
    a base;
    an applicator including an actuator and a nozzle plate defining at least one aperture, the actuator being configured to oscillate the nozzle plate to eject fluid from the at least one aperture; and
    a quick-connect connector that couples the applicator to the base for fluid communication and electrical communication therebetween, the quick-connector including a first fitting and a second fitting, the first fitting defining a groove and a nose, the second fitting including a retainer configured to be received in the groove and movable between a locked position and an unlocked position,
    wherein when in the locked position, the retainer is disposed within the groove and inhibits axial movement of the first fitting relative to the second fitting,
    wherein when in the unlocked position, the first and second fittings are axially movable relative to each other,
    wherein one of the first fitting or the second fitting is fixedly coupled to the base and the other one of the first fitting or the second fitting is fixedly coupled to the applicator.

14. The apparatus of claim 13, wherein the actuator is a piezoelectric actuator.

15. The apparatus of claim 13, wherein the applicator comprises a plurality of the actuators and a plurality of the nozzle plates, each actuator being configured to oscillate a corresponding one of the nozzle plates.

16. The apparatus of claim 15, wherein the applicator includes an array body supporting the nozzle plates, wherein the apparatus comprises a plurality of the quick-connect connectors, each quick-connect connector configured to couple a corresponding one of the nozzle plates to the array body.

17. The apparatus of claim 15, wherein the applicator includes an array body supporting the nozzle plates, wherein the quick-connect connector couples the array body to the base.

18. The apparatus of claim 13, wherein the nozzle plate includes a plurality of the apertures.

19. The apparatus of claim 13, wherein the second fitting includes a collar that is axially movable between a first position and a second position, wherein when in the first position the collar inhibits the retainer from moving to the unlocked position, and wherein when in the second position the collar permits the retainer to move to the unlocked position.

20. An apparatus for applying a coating to a substrate, the apparatus comprising:
   a base including a fluid conduit;
   an applicator including a plurality of actuators and an array of nozzle plates, each nozzle plate defining at least one aperture, each actuator being configured to oscillate a corresponding one of the nozzle plates to eject fluid from the apertures; and
   a quick-connect connector that couples the fluid conduit to the applicator for fluid communication therebetween,
   wherein the applicator includes an array body supporting the nozzle plates, wherein the apparatus comprises a plurality of the quick-connect connectors, each quick-connect connector coupling the array body to the base.

* * * * *